Feb. 21, 1928. 1,660,049
S. RIVA ET AL
STRANDING MACHINE FOR THE RAPID MANUFACTURING OF STRANDS OF
TEXTILE FIBERS OR WIRES EITHER ALONE OR COUPLED TOGETHER
Filed Jan. 17, 1927 4 Sheets-Sheet 1
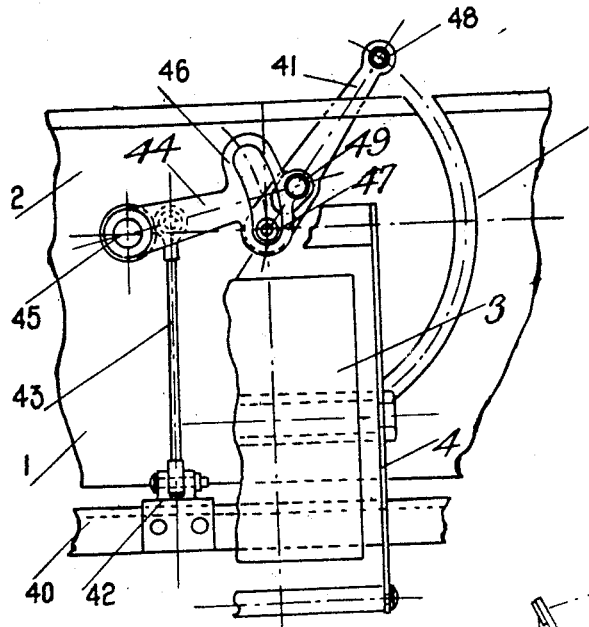
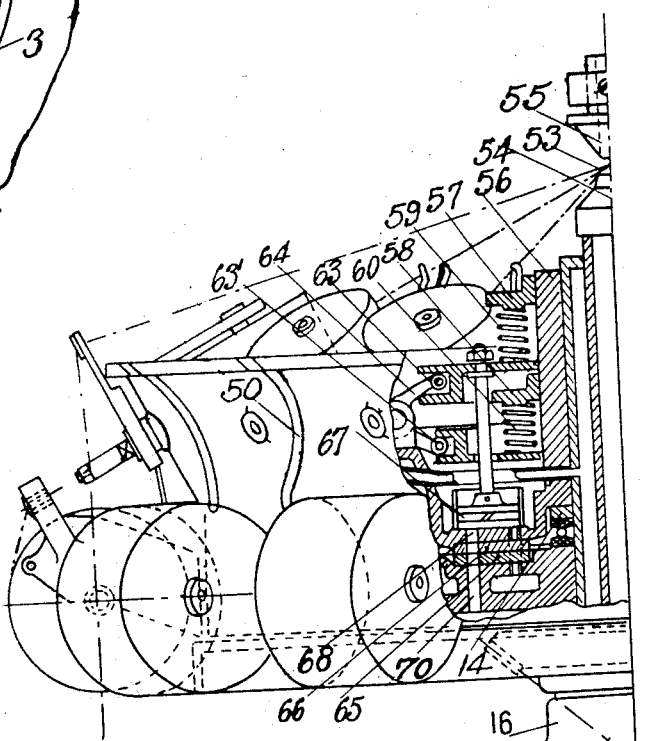
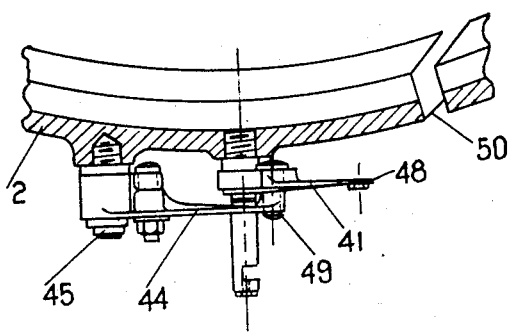
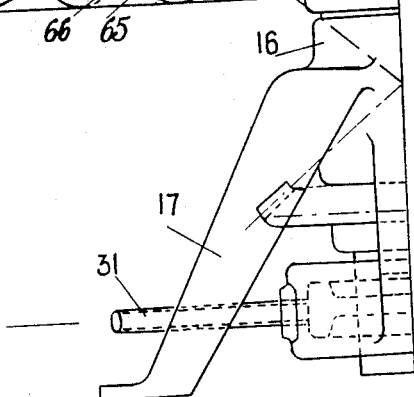
Inventors
Secondo Riva
Marino Pron
By
Attorney

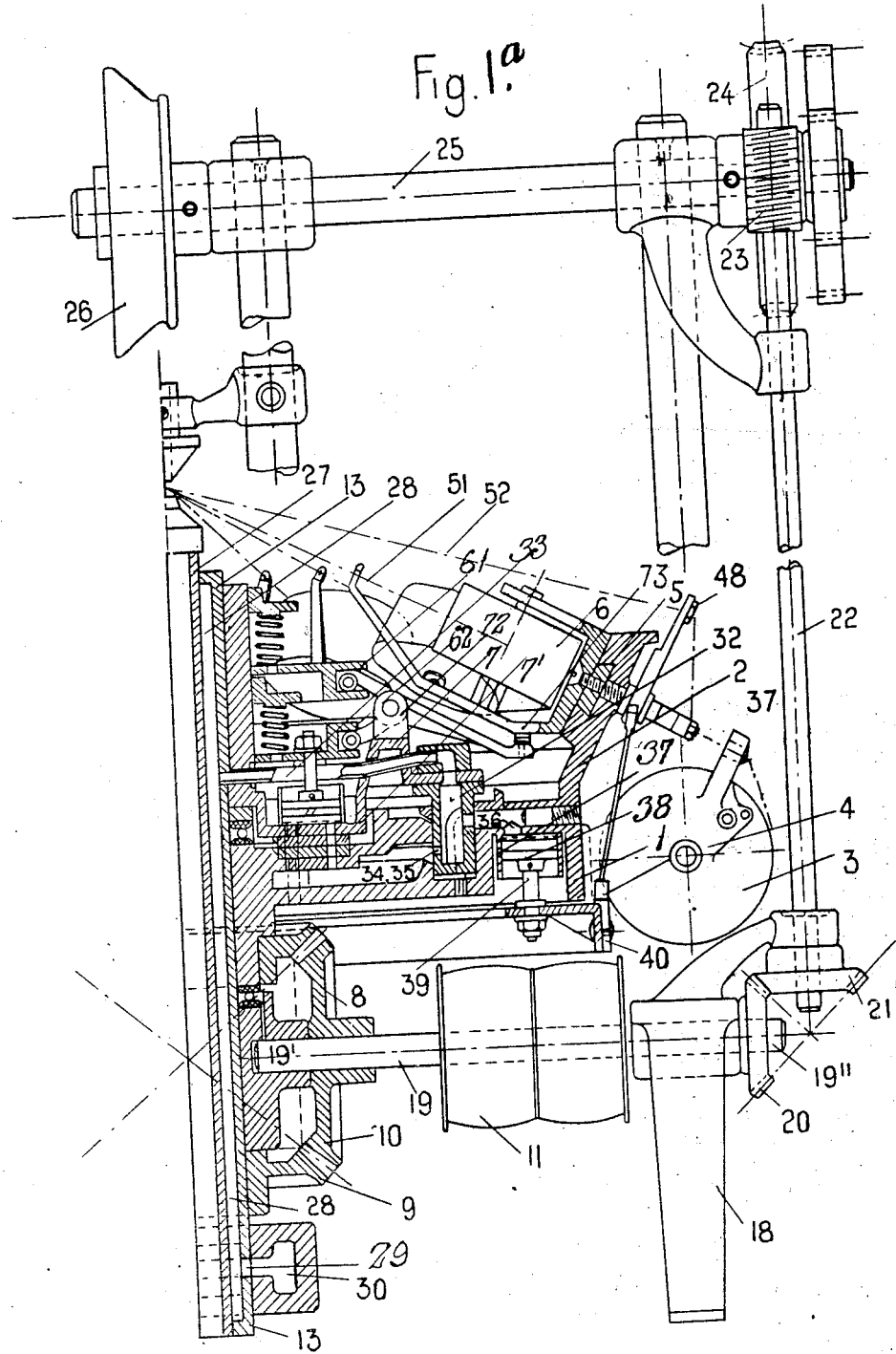

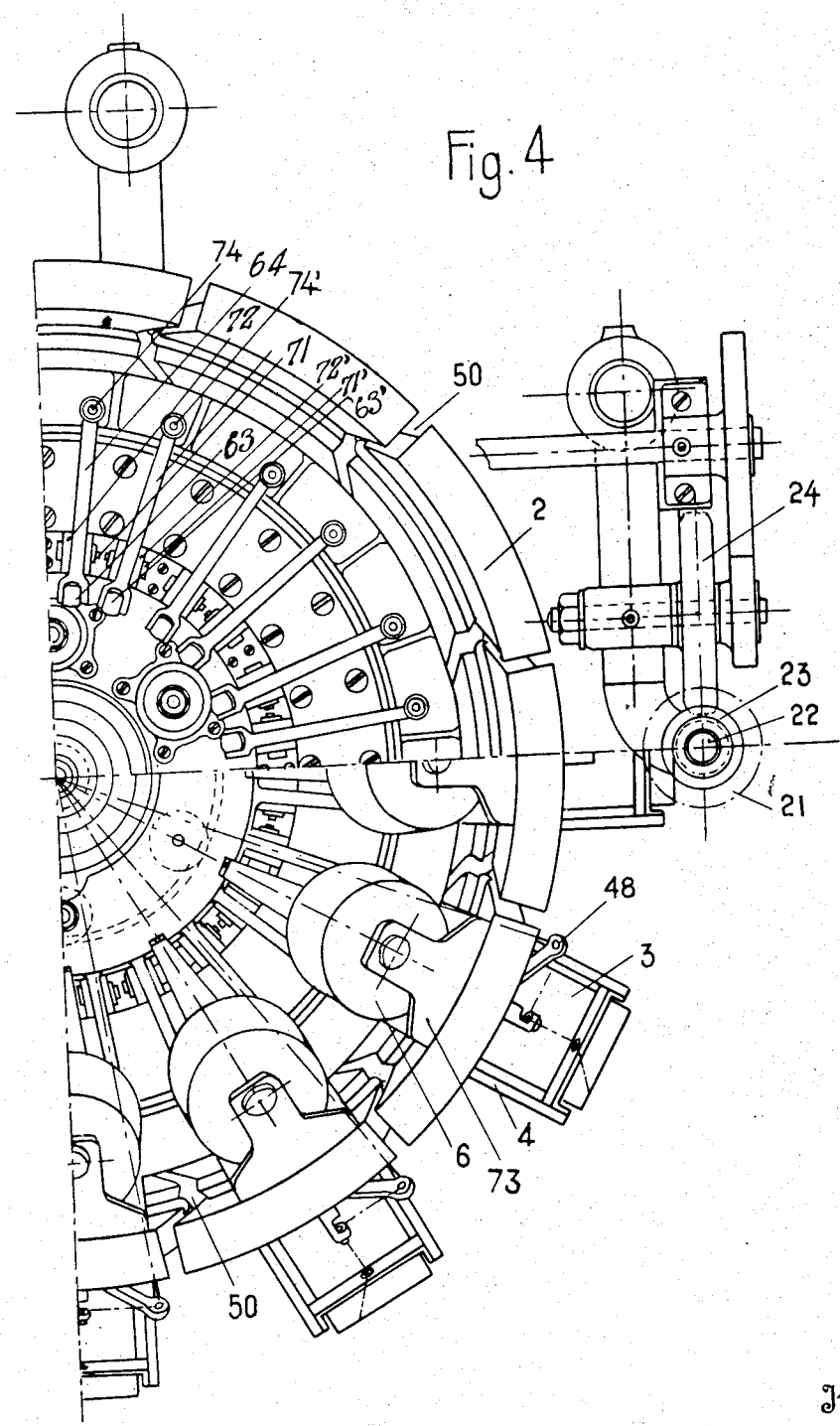

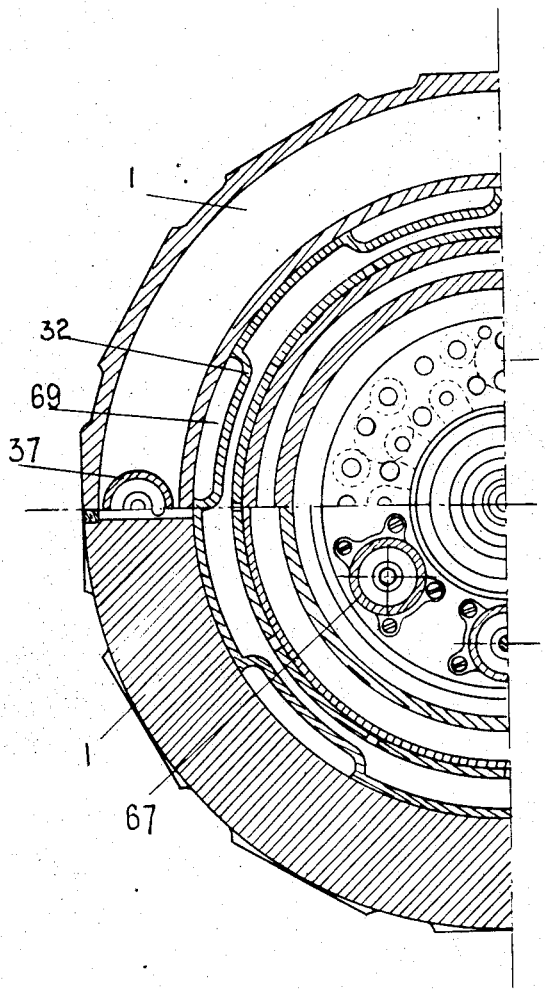

Patented Feb. 21, 1928.

1,660,049

UNITED STATES PATENT OFFICE.

SECONDO RIVA AND MARINO PRON, OF TORINO, ITALY.

STRANDING MACHINE FOR THE RAPID MANUFACTURING OF STRANDS OF TEXTILE FIBERS OR WIRES EITHER ALONE OR COUPLED TOGETHER.

Application filed January 17, 1927, Serial No. 161,667, and in Germany May 1, 1924.

It is known that the usual stranding machines, which are largely used for the manufacturing of wiring and cables for electric mains, as well as for trimmings, etc., have a very low efficiency for the following reasons:

The said machines work according to two different principles, that is to say: One type of such machine has two series of movable spools which are necessary for the said manufacture, the spools of one of these series during the work are continually obliged to perform very swift displacements in order to displace themselves from the points more distant from the axis of the machine to the points nearer the same, with violent oscillations of the tension and release of counter-weights or springs, which serve to stretch the threads or the wires alone or coupled, with the consequence of a swift tension and release of them and their breaking. Another type of such machine has two series of spools that rotate in opposite directions and are regulated in their work by means of mechanisms provided with cams, small carriages and sinusoidal slots in which run driving pins or pivots which effect at determined intervals the lowering of the threads of one series of spools in order to permit the other series to pass about them. It is therefore clear that it is impossible to obtain with such machines great working velocities and also to avoid the deafening noise produced by them.

The object of the present invention is to avoid these drawbacks by means of a stranding machine of great efficiency and of practically unlimited velocity, because in the same not only is the displacement of large masses in movement and their consequent shocks avoided, but there are also omitted the cams, and pins running at great speed in sinusoidal slots etc., for the reason that all necessary movements for twisting the threads or wires are obtained by means of operation with compressed air.

The figures of the accompanying drawings illustrate by way of example one mode of constructing a stranding machine according to the present invention.

Fig. 1 is a partially sectioned elevation of one-half of the machine.

Figure 1ª is a similar view of the other half of the machine.

Fig. 2 is a front view of a detail of construction, of the device for the lowering of the threads or wires of one series of spools, Fig. 3 is the plan view of the same. Fig. 4 is a plan view of one-half of the machine, Fig. 4ª is a horizontal cross section of the other half of the machine.

As it may be seen from the drawings, the machine is essentially formed by an outer disc 1, or spool carrier, whose lower part is cylindrical, while its upper part is enlarged upwards in the form of a basin. On the outer surface of the lower cylindrical part of the plateau 1 is placed a series of spools 3 carried by fixed bearings 4, while its inner part is provided above with dove-tailed circular guides 5, in which run a second series of movable spools 6, which, by means of a certain number of driving hooks or the like, are connected with a second disc or carrier 7 placed internally in regard to the first one and coaxial with the same.

The two discs 1 and 7 are rotated in opposite directions, but with the same angular velocity, by means of two equal bevel gear wheels 8, 9 respectively mounted above and below and driven by the same bevel gear wheel 10. This bevel gear wheel 10 is in its turn driven by the driving pulley 11, which may eventually be coupled with an automatic disconnecting device, not shown in the drawing.

The inner disc 7 is fixed to the upper part of a vertical hollow shaft 13 on the lower part of which is mounted the lower bevel gear wheel 9, while the outer disc 1 is mounted loose on the intermediate part of the said hollow shaft 13 and rotates on ball thrust-bearings placed between a ring 14 projecting from the said hollow shaft 13 and the base 16 of the machine. To the lower part of this outer disc 1 is fixed the upper bevel gear wheel 8.

The base 16 of the machine is provided with supporting legs 17 for securing the machine to the floor, while another side leg 18 serves to support the shaft 19 of the driving pulley 11.

The inner end 19′ of this shaft 19 carries the driving bevel gear wheel 10 and is journaled on a suitable point of the base 16 of the machine, while its outer end 19″ projecting beyond the side support 18 carries a bevel gear wheel 20 in engagement with another bevel gear wheel 21. The shaft 22 of the wheel 21, with the intermediate of a worm-gear 23, 24 and of the horizontal shaft 25, drives a grooved pulley 26, whose groove has the shape usually employed for this scope in the collecting devices of the stranding machines. The angular velocity of this grooved pulley 26 is regulated for each single case by means of change gears.

By means of the driving parts 20, 26 the collecting device of the machine is operated according to its capacity.

Inside the vertical hollow shaft 13 of the machine is arranged a concentric shaft 27 suitably separated from the shaft 13, and both shafts are connected together above and below in such a manner that they leave between them an annular chamber 28, which, by means of a series of holes 29, arranged near the lower end of the shaft 13, is continually supplied with compressed air by a device or ring case 30, in which the said end rotates with slight friction.

The case 30 is in its turn in communication with a reservoir (not shown) of compressed air or with an air compressor by means of the tube 31.

In the bottom of the outer disc 1 is formed a chamber 34 supplied with the compressed air coming from a hollow 32 carried by the disc 7 and which receives continually air from the chamber 28 of the vertical shaft 13, 27 by means of a certain number of pipes 33. Although this hollow ring 32, is secured to the inner disc 7, and therefore rotates in the opposite direction to that of the outer disc 1 in which is provided the chamber 34, it remains however continually in communication with the said chamber 34 by means of a suitable number of holes 35.

The periphery of the outer disc 1 is provided with a suitable number of communication holes 36, in proportion with the number of spools of the machine, which holes communicate with as many cylinders 37 in which are placed single acting pistons 38. These pistons 38, during the moments in which they are not under the action of the compressed air are kept in position of rest by means of springs not shown in Fig. 1 for simplicity.

To the rods 39 of these pistons 38 is suspended, by means of screw bolts and nuts or the like, a flanged ring 40, whose function is that of controlling the whole series of thread-guiding whips 41 (Fig. 2), which regulate at determined intervals the lowering of the threads of the outer or fixed spools 3.

The whip controlling devices hereinafter described are connected to the cylindrical border of the said ring 40 and are mounted on the part 2 of disc 1 in such a position that they cannot come into conflict either with the fixed spools 3 or with their supports 4. They are applied in equal number to that of the said spools, and each device consists of a small support 42, in which is pivoted the lower end of a rod 43 the upper end of which is connected to a suitable point of a lever 44 pivoted at 45 to the outer surface of the enlarged part 2 or basin of the outer disc 1.

The free end of the lever 44 is provided with a curved slot 46, which passes around a pivot 47 placed at the lower end of each whip 41.

The upper end of each whip 41 is provided with an eye 48 in which passes the thread or wire coming from the corresponding fixed spool 3. A pivot 49 fixed to the end of the lever 44 beyond the curved slot 46, compels the lever 41 to oscillate downwards or upwards around its pivot 47 every time the rod 43 is lowered or raised in consequence of the movements of the controlling ring 40.

The arc described by the end of the whips corresponds to the mean curvature of the corresponding grooves 50, (one for each whip), made in the upper enlarged part 2 of the outer disc 1, so that when the eye 48 describes its arc around its pivot 47, the thread or wire passing is compelled to enter in the same and go to the bottom of the corresponding groove 50, whose depth is calculated to extend under the lowest point of the sliding spools 6 and their supports 73.

The threads or wires 51 coming from the sliding spools 6 cross in the upper part of the machine with the threads or wires 52 coming from the fixed spools 3, that is to say between the limiting device 53 of the lower convergence, which rotates with the cone 54 forming part of vertical shaft 13, 27 of the machine, and the limiting device 55 of the upper convergence, schematically shown in Fig. 1.

The boss 56 of the inner disc 7 is provided with two projecting rings or flanges 57, 58, which serve as supports for the corresponding springs 59, 60 which control two rings 61, 62 respectively whose peripheries are provided with circular grooves in which are placed the end rollers 63, 63' of two trailing levers 64, 64' pertaining to each sliding spool 6. The lower ends of the trailing levers 64, 64' are shaped as hooks or the like, and the corresponding levers can oscillate around their pivots 71, 71' carried by as many supports 72, 72' projecting upwards from the upper surface of the inner disc 7.

Said lower end of these trailing levers engage the lower part of the supports 76 of the sliding spools 6, while the other end is provided with the said rollers 63, 63'. These rollers are not fixed in the corresponding grooves of rings 61, 62, but they are arranged in them with a suitable clearance which allows a little displacement of the said rollers during the movement of the rings, and have only the function of diminishing the friction between the upper ends of the trailing levers and the corresponding grooves.

The lower part of each support 73 of the sliding spools 6 can be for instance provided with two holes whose distance from one another is the same as the distance between the corresponding ends 74, 74' of the two trailing levers 64, 64' pertaining to the same pair of them, and these ends enter inside the said holes and come out of them in alternate manner.

The upper part of the chamber 34 of the base of the outer disc 1 is perforated at determined intervals with two series of holes. One of these series serves to give compressed air to the cylinders, and above said holes, with the interposition of one or two intermediate plates 65, 66, glides the base 7' of the inner disc 7, which is likewise perforated at like intervals. These intermediate plates act as distributing slide valves for the compressed air coming from the chamber 34 in order to bring it to the cylinders 67 of the inner disc 7 in the right intervals of time which are necessary for regulating the movement of the whips in regard to that of the trailing devices.

Upon the bottom 7' of the inner disc 7 is placed a series of single acting cylinders 67 with pistons working with compressed air. One half of these cylinders has the pistons in connection with the lower grooved ring 62 which commands one half of the trailing devices, as shown in Fig. 1ª, and the other half of the cylinders has the pistons in connection with the upper grooved ring 61, which commands the other half of the trailing levers as shown in the left hand part of Fig. 1.

The trailing levers, which are two for each sliding spool 6, are so arranged as to work in alternating manner, because for trailing each spool a single lever is necessary, so that each spool is trailed by turns through one or the other of the levers of the same pair according as the cylinders 67 and the corresponding pistons exert their action on the upper grooved ring 61 or on the lower one 62.

The corresponding levers are by turns freed by means of their upper ends and their rollers 63, 63' in the following manner: When the machine is set in motion and the device supplying the compressed air is regularly working, one or the other of the points of each pair of levers is alternately freed from the corresponding hole of the spool support 73 of the sliding spools 6, because the rings 61 and 62 are alternately raised by the action of the pistons in cylinders 67. The result is that, when one of the spool-supports 73 with its corresponding sliding spool 6 comes into relation with one of the slots 50 of the enlarged upper part 2 of the outer disc 1, the threads or wires 52 of the fixed spools 3 which are that moment at the bottom of the said slots 50, would come into conflict with the trailing levers 64, 64' if they, with rapid movement should not change their position. This possibility of conflict is avoided by the point 74 of one of the trailing levers coming out of the corresponding hole of the spool-support 73 while the point 74' of the other trailing lever of the same pair enters into the other hole of the same spool-support 73.

As it may be seen, the machine constructed according to the present invention works partly mechanically and partly pneumatically. The mechanical part is limited to operate the rotation of the two discs 1 and 7 in opposite directions but with the same angular velocity.

The working of the machine takes place in the following manner: After having set the machine in motion by means of the driving pulley 11, the bevel gear 10 through the upper bevel gear 8 and the lower bevel gear 9, causes the rotation of the two discs 1 and 7 in opposite directions. Under the action of the compressed air passing from the chamber 30 to the annular passage 28 existing between the tubes 13 and 27 which form the shaft of the machine, the air, through the pipes 33, the hollow ring 32 and the chamber 34, reaches the series of cylinders 67, whose pistons by alternately raising cause the setting free of one half of the trailing levers 64 or 64'. This happens when these trailing levers are in proximity of the curved slots 50.

At the same time, the compressed air coming from the pipes 33 finds at suitable intervals the free passage for filling up the outer cylinders 37, whose pistons 38 by means of their sinking cause the contemporary sinking of all the whips 41 by means of their operating ring 40.

The lowered whips bring the threads or wires 52 of the fixed spools under the sliding spools 6, which by proceeding in the way of their rotation arrive at a point in which the first half of the trailing levers, for instance 64, renew their coupling, and, almost at the same time, but with a very little delay, the second half of the trailing levers 64' release their coupling, so that they can pass under the threads or wires 52 of the said fixed spools 3, which threads continue to remain below by the action of the whips.

When the second series of the trailing levers 64' is coupled again with the corresponding supports of the sliding spools, the whips rise again and permit the passage of another sliding spool 6 under the threads of the fixed spools 3. The movements of uncoupling and coupling of the first half of trailing levers is simultaneous, and the movement of uncoupling and coupling of the second half of trailing levers is simultaneous, and likewise the lowering and the rising of the series of whips.

The said three movements are angularly spaced for the purpose of obtaining the proper working. The coupling and uncoupling of the outer ends of the trailing levers with the corresponding spool-supports 73 of the sliding spools 6 is very simple, because the coupling devices of the said trailing levers may consist of simple projections 74, 74' which can very rapidly enter in the corresponding holes made in the base of the spool supports 73, and just as rapidly leave them.

The distributing plates 65, 66, of which the plate 65 is screwed to the outer disc 1, while the plate 66 is screwed to the inner disc 7, slide upon each other and by means of their holes the movements of coupling and uncoupling of the trailing levers take place at like angular intervals.

The discharge of the compressed air, which has already accomplished its work, from the cylinders 67 of the inner disc 7, takes place through a certain number of holes 68 which correspond to the outlet holes 70 of the bottom of the outer disc through the corresponding holes of the said intermediate plates 65, 66.

The discharge of the compressed air from the cylinders 37 of the outer disc 1, takes place through a suitable number of niches 69 (Fig. 4) arranged in the ring 32 which turns with the inner disc 7.

It will be understood that the invention is not limited to the particular construction and arrangement of the parts herein described and illustrated, which merely show by way of an example one manner of carrying the invention into practice, and that any modifications within the range of every expert may be made as required or rendered advantageous by the circumstances or the requirements of practice without departing from the essential nature of this invention.

Having thus described our invention, we claim as new and desire to secure by Letters Patent:

1. A stranding machine comprising an outer rotary carrier, an outer series of spools carried by the latter, a concentric inner series of spools slidably mounted on the carrier, an inner carrier, means to rotate the carriers in opposite directions at the same angular velocity, two series of driving members for the inner series of spools mounted on the inner carrier, a series of thread guides for the outer series of spools mounted on the outer carrier, a thread-guide actuating member carried by the latter, and pneumatically operated mechanism controlled by the rotary movements of the carriers for operating said actuating member and simultaneously operating one of the series of driving members.

2. A stranding machine comprising an outer carrier and outer series of spools carried by the latter, a concentric inner series of spool supports slidably mounted on the carrier, an inner carrier, means to rotate the carriers in opposite directions at the same angular velocity, two series of levers fulcrumed on the inner carrier in operative relation to the spool supports, means to simultaneously rock each series of levers in opposite directions, a series of thread-guides for the outer series of spools mounted on the outer carrier, a series of pneumatically operated pistons carried by the latter, a thread-guide actuating member carried by the pistons, and means controlled by the rotary movements of the carriers for supplying compressed air to said pistons for operating said actuating member.

3. A stranding machine comprising an outer carrier, an outer series of spools carried by the latter, a concentric inner series of spool supports slidably mounted on the carrier, an inner carrier, means to rotate the carriers in opposite directions at the same angular velocity, two series of levers fulcrumed on the inner carrier in operative relation to the spool supports, a controlling member for each series of levers, a series of pistons operatively connected with each control member, an air distributing chamber in the outer carrier, and means operated by the rotation of the carriers to alternately supply air from said chamber to each series of pistons for alternately actuating said control members.

4. A stranding machine comprising an outer carrier, an outer series of spools carried by the latter, a concentric inner series of spool supports slidably mounted on the carrier, an inner carrier, means to rotate the carriers in opposite directions at the same angular velocity, two series of levers fulcrumed on the inner carrier in operative relation to the spool supports, a controlling member for each series of levers, a series of pistons carried by the inner carrier operatively connected with each control member, an air distributing chamber in the outer carrier, and means operated by the rotation of the carriers to alternately supply air from said chamber to each series of pistons for alternately actuating said control members.

5. A stranding machine comprising a central shaft having a chamber for compressed air, an outer carrier rotatably mounted on the shaft and having an air chamber communicating with the chamber of the shaft, two concentric series of spools mounted on the carrier, means including the carrier for revolving the two series in opposite direction at the same angular velocity, a series of thread guides for one series of spools mounted on the carrier, a plurality of cylinders on the latter, an air distributing chamber communicating with the chamber of the shaft and having ports controlled by the carrier for supplying air to said cylinders, pistons in said cylinders, a thread-guide actuating member carried by said pistons and operable by the movements of the latter to operate the thread-guides.

6. A stranding machine comprising a central hollow shaft constituting a compressed air chamber, an outer carrier rotatably mounted on the shaft and having a chamber communicating with said air chamber, an inner carrier fixed on the shaft, means including the latter for rotating the carriers in opposite directions, an outer series of spools carried by the outer carrier, a concentric inner series of spool supports slidable on the latter, two series of two-armed levers fulcrumed on the inner carrier, each lever having one end arranged to engage a spool support, a controlling member for each series of levers movable axially of the shaft and operatively connected with the other ends of the levers, two series of pneumatically operated means connected with said controlling members, and means operated by the rotation of the carriers whereby the air from the chamber in the outer carrier is supplied alternately to each series of pneumatically operated means.

7. A stranding machine comprising a central hollow shaft constituting a compressed air chamber, an outer carrier rotatably mounted on the shaft and having a chamber communicating with said air chamber, an inner carrier fixed on the shaft, means including the latter for rotating the carriers in opposite directions, an outer series of spools carried by the outer carrier, a concentric inner series of spool supports slidable on the latter, two series of two-armed levers fulcrumed on the inner carrier, each lever having one end arranged to engage a spool support, a controlling member for each series of levers movable axially of the shaft and operatively connected with the other ends of the levers, two series of cylinders carried by the inner carrier, pneumatically operated pistons in said cylinders connected to the controlling members, ports for connecting the cylinders with the chamber in the support, and ported valve plates connected to the carriers interposed between the cylinders and carrier chamber, whereby compressed air from the latter is admitted to the cylinders for actuating the controlling members alternately.

8. A stranding machine comprising a central hollow shaft constituting a compressed air chamber, an outer carrier rotatably mounted on the shaft and having a chamber communicating with said air chamber, an inner carrier fixed on the shaft, means including the latter for rotating the carriers in opposite directions, an outer series of spools carried by the outer carrier, a concentric inner series of spool supports slidable on the latter, two series of two-armed levers fulcrumed on the inner carrier, each lever having one end arranged to engage a spool support, a controlling member for each series of levers movable axially of the shaft and operatively connected with the other ends of the levers, two series of cylinders carried by the inner carrier, pneumatically operated pistons in said cylinders connected to the controlling members, ports for connecting the cylinders with the chamber in the supports, ported valve plates connected to the carriers interposed between the cylinders and carrier chamber, an annular air distributing chamber carried by the inner carrier, communicating with the central air chamber, a plurality of cylinders on the outer carrier having ports for communication with said annular chamber, pistons in the last named cylinders, an annular controlling member suspended from the last named pistons, and thread-guides pivoted on the outer carrier operatively connected to the controlling member.

9. A standing machine, comprising an outer rotary carrier, an outer series of spools carried by the latter, a concentric inner series of spool supports slidably mounted on the carrier, an inner carrier, means to rotate the carriers in opposite directions at the same angular velocity, two series of driving members on the inner carrier, means for alternately actuating each series of driving members to connect them to the spool supports, a thread guide for each spool of the outer series consisting of an arm pivoted on the periphery of the outer carrier adjacent each spool and having an eye in its free end for the thread, an arcuate slot in said periphery concentric to the pivot of said arm to permit a thread in the eye to pass below said spool supports, a controlling member carried by the outer support operatively connected with the pivoted arms for raising and lowering the latter, and means whereby said controlling member is operated simultaneously with the actuation of the driving members.

SECONDO RIVA.
MARINO PRON.